United States Patent
He et al.

(10) Patent No.: US 8,743,970 B2
(45) Date of Patent: Jun. 3, 2014

(54) VIDEO DECODING WITH ERROR DETECTION AND CONCEALMENT

(75) Inventors: Zhongli He, Austin, TX (US); Xianzhong Li, Shanghai (CN)

(73) Assignee: Freescale Semiconductor, Inc., Austin, TX (US)

( * ) Notice: Subject to any disclaimer, the term of this patent is extended or adjusted under 35 U.S.C. 154(b) by 955 days.

(21) Appl. No.: 12/422,684

(22) Filed: Apr. 13, 2009

(65) Prior Publication Data

US 2010/0260269 A1 Oct. 14, 2010

(51) Int. Cl.
*H04N 7/12* (2006.01)
*H04N 11/02* (2006.01)

(52) U.S. Cl.
USPC .................. 375/240.27; 375/240.24

(58) Field of Classification Search
USPC ....................................... 375/240
See application file for complete search history.

(56) References Cited

U.S. PATENT DOCUMENTS

| | | | |
|---|---|---|---|
| 6,489,996 B1 * | 12/2002 | Matsumura et al. | 348/416.1 |
| 2006/0072676 A1 * | 4/2006 | Gomila | 375/240.27 |
| 2006/0251177 A1 | 11/2006 | Webb | |
| 2007/0002081 A1 * | 1/2007 | Sakata | 345/690 |
| 2008/0084934 A1 | 4/2008 | Agrawal | |
| 2008/0232478 A1 * | 9/2008 | Teng et al. | 375/240.27 |
| 2009/0144596 A1 * | 6/2009 | Mohan | 714/746 |
| 2010/0002775 A1 * | 1/2010 | Huang et al. | 375/240.24 |

* cited by examiner

*Primary Examiner* — Sath V Perungavoor
*Assistant Examiner* — Xiaolan Xu
(74) *Attorney, Agent, or Firm* — Gary Stanford

(57) ABSTRACT

A system and method of decoding input video information is disclosed which includes performing error detection for each video block of a frame, determining whether a scene change occurs for the frame, and when an error is detected in a video block, performing spatial concealment by concealing error of the erroneous video block using neighboring video information within the frame when the erroneous video block is intraframe encoded or when a scene change is detected for the frame, or performing temporal concealment by replacing the erroneous video block with a reference video block from a reference frame when the erroneous video block is interframe encoded and when a scene change is not detected for the frame. The method may further include detecting false frames based on comparing current and new frame number and picture order count values of a new slice.

20 Claims, 6 Drawing Sheets

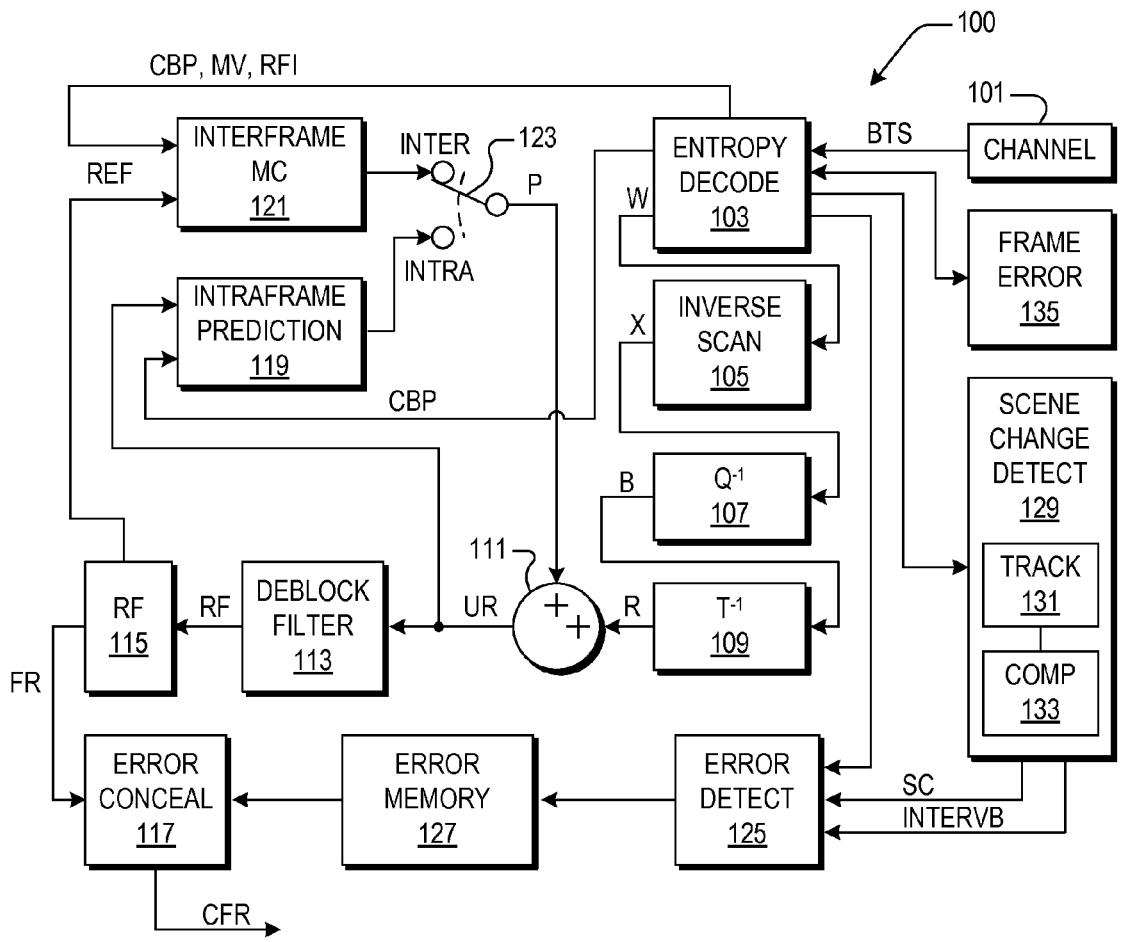
FIG. 1
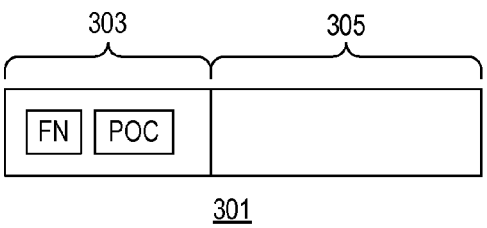
FIG. 2
FIG. 3

INTERPOLATION

VIDEO DECODING WITH ERROR DETECTION AND CONCEALMENT

BACKGROUND OF THE INVENTION

1. Field of the Invention

The present invention relates in general to video information processing, and more specifically to a system and method of video decoding with error detection and concealment.

2. Description of the Related Art

Video capability is becoming more prevalent for mobile devices. Such mobile devices, however, usually rely on wireless communications through a wireless channel, which is often an error prone channel. In an error prone channel, visual quality degradation occurs because of an error-corrupted bitstream. The corrupted bitstream may heavily degrade the visual quality of any one or more individual frames or pictures. In certain configurations the corrupted bitstream may cause extra false or fake frames which degrades visual quality and results in audio/visual (A/V) synchronization problems. As an example, errors at the bit level in a video slice may cause the video decoder to erroneously interpret the next slice of a current frame to be a first slice of a new frame. As a result, a frame containing multiple slices may be mistakenly decoded as multiple fake frames. Multiple fake frames may occur, for example, in video decoders operating according to the International Telecommunication Union (ITU) H.264 standard, otherwise known as the Advanced Video Coding (AVC) standard, which is Part 10 of MPEG-4 (Motion Picture Experts Group). In general, multiple fake frames may occur in any standard in which a video slice header incorporating a frame number (FN) and/or a picture order count (POC) is corrupted.

Certain video standards do not provide for error correction or concealment in the event of a corrupted bitstream. In some configurations, for example, corrupted video slices are simply discarded resulting in significant visual degradation. Instead of dropping the video slice, attempts have been made to correct or conceal the damaged slice. Scene change detection may be considered for correction or concealment attempts. Most scene change detection algorithms, however, suffer from high computational complexity, which is particularly problematic for mobile devices with limited computational capacity. Conventional error concealment often results in serious visual deterioration, especially when during a scene change. In the case of a scene change, some intraframe encoded video blocks have been decoded as interframe or skip video blocks due to bit-errors within the video block. If these fake non-intraframe encoded video blocks are concealed with temporal information, a seriously degraded cut-and-paste picture is often produced, and subsequent pictures are further deteriorated due to motion compensation using the wrong information, such as a previous frame that was part of a different scene.

BRIEF DESCRIPTION OF THE DRAWINGS

The benefits, features, and advantages of the present invention will become better understood with regard to the following description, and accompanying drawings where:

FIG. 1 is a simplified block diagram of a video decoding system implemented according to one embodiment;

FIG. 2 is a block diagram of an exemplary table of flags or values stored within the memory of FIG. 1 as controlled by the error detection circuit;

FIG. 3 illustrates an exemplary video slice with a slice header including frame number and picture order count used for identifying fake frames;

DETAILED DESCRIPTION

Figure 4:
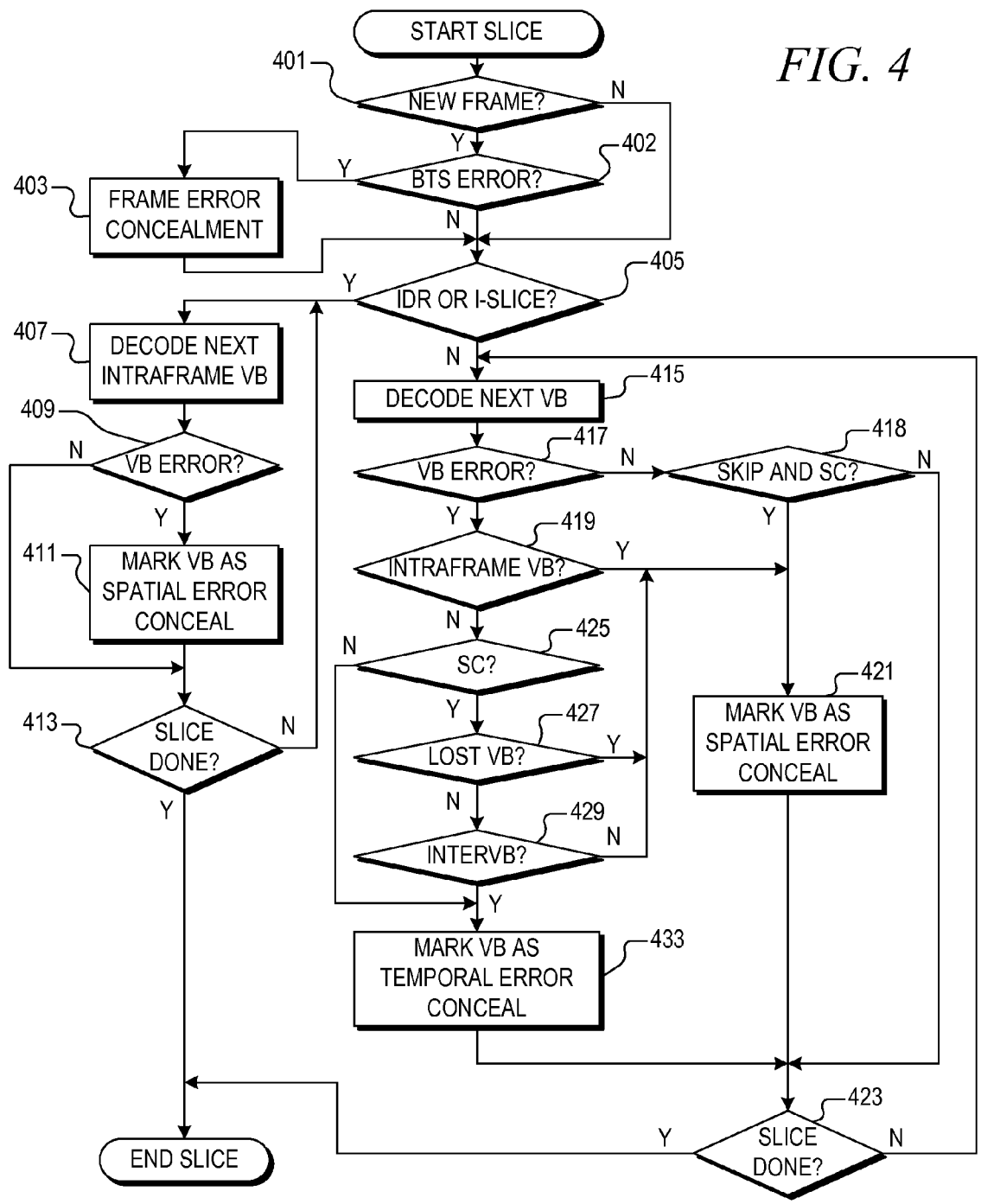
FIG. 4 is a flowchart diagram illustrating operation of the video decoding system of FIG. 1 according to one embodiment for decoding each video slice received in the bitstream.

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present disclosure describes video information processing systems according to exemplary embodiments. It is intended, however, that the present disclosure apply more generally to any of various types of "video information" including video sequences (e.g. MPEG), image information, or image sequencing information. The term "video information" as used herein is intended to apply to any video or image or image sequence information. The present disclosure applies to many different video standards, including, but not limited to, H.264, H.263 Profile 3, MPEG-4 (Motion Picture Experts Group) Part-2, MPEG-4 Part 10, MPEG-4 AVC, etc.

FIG. 1 is a simplified block diagram of a video decoding system 100 implemented according to one embodiment. It is appreciated that the block diagram is simplified and that many details are omitted and that alternative topologies are possible and contemplated. The video decoding system 100 is provided for a video device (not shown) which may include other logic, circuitry, and/or components that are not shown, such as communication circuitry, interface circuitry, and input/output (I/O) devices, such as a keyboard, a touchscreen, a microphone, a speaker, a display, etc. In one embodiment, the video device is a mobile or handheld device, such as a mobile phone, a personal digital assistant (PDA), a mobile or laptop computer, etc. The present invention is not limited to mobile or handheld devices, however, and may be applied to any video decoding system in which error concealment is needed or desired.

The video decoding system 100 receives an input bitstream BTS transmitted via a channel 101, where the bitstream incorporates video information encoded according to any one of several video standards (e.g., MPEG-4, H.264, H.263, etc.). In one embodiment, the video information is partitioned into frames which are further partitioned into slices, in which each video slice incorporates one or more video blocks. The video information is typically processed and transmitted in slices.

The video information may be encapsulated into RTP (real time transport) packets or the like including multiple video blocks of multiple video slices of multiple video frames. In one embodiment, the channel 101 is generally a relatively unreliable medium, such as a wireless medium or the like, so that the bitstream BTS has erroneous information. For example, it is possible that one or more packets are lost in transmission, or that various bit errors occur, so that the corresponding lost data must be replaced, reconstructed or otherwise error-concealed. The video decoding system 100 is configured to perform spatial, temporal, and fake frame error concealment to reduce or otherwise minimize the effect of the erroneous information. At least one goal is to conceal the errors to the extent possible to provide an improved visual result as compared to conventional error concealment methods.

The input bitstream BTS is provided to an entropy decode circuit 103, which outputs scanned quantized transform coefficients W. The W coefficients are provided to an input of an inverse scan circuit 105, which provides quantized transform coefficients X to the input of an inverse quantization circuit 107. The inverse quantization ($Q^{-1}$) circuit 107 provides estimated transform information B to an input of an inverse transform coding circuit 109. The inverse transform ($T^{-1}$) coding circuit 109 performs a block transform, such as the inverse discrete cosine transform (IDCT) or the like, and provides residual information R to a first input of a combiner 111. The combiner 111 has another input receiving selected prediction information P. In one embodiment, the combiner 111 adds the prediction information P to the residual information R to generate unfiltered reconstructed information UR. The UR information is provided to an input of a deblocking filter circuit 113 (e.g., per H.264 specification), which filters the UR information and provides reconstructed filtered information RF to an RF storage 115. Reconstructed frames FR from the RF storage 115 are provided to an input of an error concealment circuit 117. The error concealment circuit 117 performs spatial and temporal error concealment to conceal erroneous video information within the reconstructed frames FR to provide corrected frames CFR for storage or display.

The entropy decode circuit 103 operates according to any one of multiple standards depending upon the encoding method of the video information in the bitstream BTS. In one embodiment, the entropy decode circuit 103 performs context adaptive variable length coding (CAVLC), context based adaptive binary arithmetic coding (CABAC), single universal variable length coding (UVLC), etc. The video information incorporates multiple video frames, in which each video frame is subdivided into video blocks and encoded. One or more video blocks are incorporated into slices in which one or more slices forms each video frame. In one embodiment, the video decoding system 100 receives the video slices and processes each video block (VB) of the input video information. Although the present disclosure refers to video blocks (e.g., macroblocks or the like), it is understood that the present invention applies to any size video block, including video blocks of pixel size 2×2, 4×4, 2×4, 4×2, 4×8, 8×4, 8×8, 8×16, 16×8, 16×16, etc. In the 4:2:0 format, each video block contains 16×16 Y (luminance or "luma") values, 8×8 Cb (blue color difference chrominance or "chroma") values, and 8×8 Cr (red color difference chroma) values. Alternative YCbCr formats include the 4:2:2 and 4:4:4 formats as known to those skilled in the art.

Each video block is encoded in "intraframe" encoding mode in which a prediction video block is formed based on reconstructed video blocks in a current frame, or "interframe" encoding mode in which a prediction video block is formed during motion estimation based on reference video blocks from one or more reference frames. The intraframe mode applies spatial information within the current frame in which a prediction video block is formed from samples in the current frame that have previously encoded, decoded and reconstructed. The interframe mode utilizes temporal information from previous and/or future reference frames to estimate motion to form the prediction video block. The entropy decode circuit 103 determines the encoding type of input video blocks and provides a coded block pattern (CBP), among other information, to either an intraframe prediction circuit 119 or to an interframe motion compensation circuit 121 depending upon the encoding type. For interframe encoding, the entropy decode circuit 103 further provides motion vector (MV) information and reference frame index (RFI) information to the interframe motion compensation circuit 121.

One or more reconstructed frames in the RF storage 115 are used as reference information REF provided to the interframe motion compensation circuit 121. The interframe motion compensation circuit 121 uses the reference information REF and the CBP, MV, RFI information from the entropy decode circuit 103 to generate motion compensated prediction information (e.g., interframe prediction video block) INTER, which is provided to a first input terminal of a selector switch 123. The switch 123 is illustrated as a single-pole, double-throw (SPDT) having two input terminals and a common terminal output. The intraframe prediction circuit 119 uses the UR information from the combiner 111 and the CBP from the entropy decode circuit 103 to develop intraframe prediction information (e.g., intraframe prediction video block) INTRA, which is provided to the other input terminal of the switch 123. The switch 123 selects between the interframe prediction information INTER and the intraframe prediction information INTRA based on the encoding type information sent by the encoder and determined by the entropy decode circuit 103 and provides the selected prediction information P to one input of the combiner 111.

An error detection circuit 125 is coupled to the entropy decode circuit 103 to detect whether there are errors in the input bitstream BTS including any errors in each video block being processed. In one embodiment, the input bitstream BTS does not incorporate cyclic redundancy check (CRC) information. For each video sequence received in the bitstream BTS, the error detection circuit 125 identifies any sequence header, frame header errors, slice header errors and video block errors. The error detection circuit 125 flags the bitstream BTS or video sequence as erroneous for any error identified at any level, and flags any frame as erroneous for any error within that frame (e.g., errors in frame header, any slice headers, and erroneous video blocks, etc.). For video block errors, the error detection circuit 125 performs intraframe error detection (for intraframe encoded video blocks) and interframe error detection (for interframe encoded video blocks). Any erroneous video block is considered damaged and error concealment is performed as further described below. A LOST video block is defined as an erroneous video block in which the encoding type is unknown. Another normal type of video block is referred to as a SKIP video block in which the motion vector and residual information are both zero. During normal decoding, a co-located video block from a reference frame is simply copied as the current video block of the current frame for a SKIP video block. Normal SKIP video blocks are generally counted as interframe encoded type video blocks except when a scene change is detected since SKIP video blocks usually do not occur during a scene change. In one embodiment, a SKIP video block is treated as a LOST video block during a scene change.

In order to detect video block errors, the error detection circuit 125 determines whether the received information for each video block is within a predetermined range and whether there are any transform coefficient (e.g., DCT coefficient) errors. The error detection circuit 125 checks whether each coefficient value is within specified range, whether the total number of coefficients or the last coefficient position is greater than the maximum allowable count (such as for sub-blocks, e.g., 8×8 or 4×4 blocks), whether a maximum video block number overflow error occurs, among other validity checks. The error detection circuit 125 stores video block error information within an error memory 127, which information is provided to the error concealment circuit 117. In one embodiment, the error memory 127 stores multiple error flags for each video block of each decoded and reconstructed frame as further described below. In one embodiment, the flag information identifies each erroneous video block within each frame, identifies the encoding type of each erroneous video block of each video frame if known (intraframe or interframe) or LOST is unknown, and one or more flags which determine whether spatial or temporal error concealment is applied by the error concealment circuit 117.

A scene change detection circuit 129 is coupled to the entropy decode circuit 103 to perform scene evaluation including detecting a scene change for the video information. In one embodiment, the scene change detection circuit 129 includes a tracking circuit 131 which tracks statistical information including a number of intraframe encoded video blocks so far INTRA#, a number of interframe encoded video blocks so far INTER# (which includes SKIP video blocks without a scene change), and a number of lost video blocks so far LOST# (which includes SKIP video blocks during scene change) for each frame. In one embodiment, the tracking circuit 131 determines the number of video blocks received for decoding so far VBCOUNT#, although the count number may be determined by as INTRA#+INTER#+LOST#=VBCOUNT# for each frame. The tracking circuit 131 may be configured to track any three of the four numbers INTER#, INTRA#, LOST# and VBCOUNT# and derive or calculate the fourth number rather than separately tracking all four numbers. The scene change detection circuit 129 further includes a comparator circuit 133 which uses the statistical information to provide scene evaluation values SC and INTERVB to the error detection circuit 125. In one embodiment, a scene change is detected by the scene change detection circuit 129 when INTRA#/VBCOUNT# (in which forward slash "/" denotes division) achieves a first predetermined threshold TH1, or when INTRA#/VBCOUNT#>TH1. In one embodiment, the first predetermined threshold TH1 is a relatively high value, such as within a range of 0.8-0.9 representing a relatively high percentage (80%-90%) of intraframe encoded video blocks. In one embodiment, the scene change determination is not evaluated or otherwise indicated until VBCOUNT# reaches a predetermined minimum threshold MINCNT, or when VBCOUNT#≥MINCNT. In one embodiment, MINCNT represents a predetermined decoded percentage of a complete frame (e.g., such as 30%-40% of a full frame). The SC value is asserted or otherwise provided when the first threshold TH1 is achieved indicating a scene change.

In one embodiment, the comparator circuit 133 performs a second scene check for a more accurate determination of the video block type in the event of a video block error. In this case, whenever INTER#/VBCOUNT# is greater than a second predetermined threshold TH2, e.g., when INTER#/VBCOUNT#>TH2, then the second value INTERVB is provided. The second threshold TH2 indicates the relative number of interframe encoded video blocks in the frame so far. In one embodiment, the second predetermined threshold TH2 is a relatively low value, such as within a range of 0.1-0.15 representing a relatively low percentage (10%-15%) of interframe encoded video blocks in the frame. The INTERVB value is asserted or otherwise provided when the second threshold TH2 is achieved providing a more accurate determination of the video block type. The scene change detection circuit 129 provides the first and second scene evaluation values SC and INTERVB to the error detection circuit 125, which uses the scene evaluation information to determine the type of error concealment that is to be applied for each video block and sets the corresponding flags within the memory 127. As noted above, the SC and INTERVB values are not provided until the minimum number MINCNT of video blocks has been decoded. Whenever the SC or INTERVB values are not provided, the error detection circuit 125 determines the type of error concealment based on the type of encoding used for the video block (interframe versus intraframe) as further described below.

FIG. 2 is a block diagram of an exemplary table 201 of flags or values stored within the memory 127 as controlled by the error detection circuit 125. The table 201 includes a first column identifying the video block number VB# for specifically identifying each video block of the current frame. As shown, the video blocks are listed in sequential numeric order (1, 2, 3, 4, 5, etc.) which may be row-by-row or column-by-column of the current frame. The second column identifies an ERR value indicating whether the corresponding video block has an error or not. As shown, the ERR value is a binary value with "0" indicating no error and "1" indicating an error. The third column indicates the encoding type for the corresponding video block, which is "0" for intraframe encoding, "1" for interframe encoding, and "2" for a LOST video block. SKIP video blocks are counted as interframe encoded blocks except during a scene change in which SKIP video blocks are counted as LOST. A fourth column provides an error concealment (EC) value which indicates the method to be applied by the error concealment circuit 117 for each video block as determined by the error detection circuit 125. The EC value is shown as "0" if the video block does not have an error (in which the ERR value is 0), and the EC value is shown as "S" if spatial error concealment is to be applied or "T" if temporal error concealment is to be applied. Note that VB#5 is a LOST erroneous video block marked for temporal error concealment, which is the case when a scene change is not detected. In the event of a scene change, LOST erroneous video blocks are marked for spatial error concealment.

When a video block is erroneous and temporal error concealment is designated, a reference video block from a reference frame is copied as the current video block of the current frame. The reference video block is either a co-located video block or a video block pointed to within the reference frame by a corresponding motion vector. When a video block is erroneous and spatial error concealment is designated, information from neighboring video blocks within the current frame is used to conceal the errors of the current video block. In one spatial error concealment method, pixel values from adjacent video blocks above and below or on both sides, if valid, are interpolated across the current video block. If only one adjacent video block is valid, then the pixel values of the erroneous video block are padded with aligned pixel values from the valid adjacent video block.

Referring back to FIG. 1, a frame error concealment circuit 135 is coupled to the entropy decode circuit 103 to detect and reduce or otherwise minimize "fake" frames. A fake frame occurs when a new video slice received from the bitstream BTS for a current frame is incorrectly decoded as a new frame rather than as another slice for the current frame. As shown in FIG. 3, an exemplary video slice 301 is shown with a slice header 303 and a slice payload 305. For certain encoding standards, such as H.264, the slice header 303 includes a frame number (FN) value and a picture order count (POC) value. The FN value increases in decoding order of access units whereas the POC value denotes the display order of the decoded frames. In general, a new frame is indicated whenever the FN value changes or whenever the POC value changes. For MPEG encoding, a group of pictures (GOP) is a group of successive frames within an MPEG encoded video stream. A first frame for each GOP is an instantaneous decoding refresh (IDR) frame followed by one or more I-frames (intraframe encoded picture) and/or one or more P-frames (predicted picture) and/or one or more B-frames (bi-predicted picture). The FN value is reset to "0" for each IDR frame and is incremented for each subsequent frame in the GOP. The POC value starts at an initial value (e.g., "0") and continues to increase throughout the entire video sequence. When either the FN or the POC value changes in the slice header 203, the entropy decode circuit 103 interprets the change as a new frame. If the FN value and/or the POC value in a video slice has been corrupted because of the unreliable channel 101 such that the new slice is actually part of the current frame, then in conventional configurations, the entropy decode circuit 103 erroneously decodes the new slice as a new frame resulting in a fake frame.

When an error is detected in the video bitstream BTS, the frame error concealment circuit 135 monitors the FN and POC values, if present, and determines whether the next slice is part of the current frame or part of a new frame in order to reduce the number of fake frames. In one embodiment, after an error is detected, when the previous FN value (for the current frame) is not 0 and is equal to the new FN value (of a new slice), or when the previous FN value is not 0 and the previous POC value is equal to the new POC value, or when the new FN value is different from the previous FN value by more than a predetermined maximum FN difference value ΔFNMAX, then the new slice is not decoded as a new frame and instead is decoded as part of the current frame. In one embodiment, ΔFNMAX is 16. It is noted that some video standards do not include the FN and POC values in the slice header. The frame error concealment circuit 135 operates for video information encoded according to H.264 and any other method which has slice headers including at least the FN value. It is noted that if the FN value is provided but the POC value is not provided, at least two conditions may be evaluated (i.e., if the previous FN value is not 0 and is equal to the new FN value, or if the new FN value is different from the previous FN value by more than ΔFNMAX). If neither of these values is provided, then the frame error concealment circuit 135 is inactive for the video information. Also, in one embodiment, the frame error concealment circuit 135 checks for fake frames only after an error is detected in the input video bitstream BTS since fake frame detection might otherwise introduce errors in an otherwise error free bitstream.

FIG. 4 is a flowchart diagram illustrating operation of the video decoding system 100 according to one embodiment for decoding each video slice received in the bitstream BTS. Each video slice is processed one video block at a time. At first block 401, it is queried whether a new video slice, which becomes the current video slice, indicates a new frame in the video sequence. If so, operation proceeds to block 402 to determine whether the error detection circuit 125 has detected an error in the input bitstream BTS. If so, operation proceeds to block 403 to perform frame error concealment to determine whether the current slice should be processed as part of the current frame instead of a new frame. After frame error concealment processing indicated at block 403, or if the current slice does not indicate a new frame as determined at block 401, or if there is not BTS error as determined at block 402, operation proceeds to block 405 to determine whether the current slice is an IDR slice or an I-slice. If the slice is either an IDR slice or an I-slice, then the slice includes only intraframe encoded video blocks so that operation proceeds to block 407 in which the video decoding system 100 begins decoding the next intraframe video block (VB) in the current IDR or I-slice. At next block 409, while decoding the next video block the error detection circuit 125 determines and indicates whether there are any errors in the next or current video block within the current slice. If the video block is erroneous, operation proceeds to block 411 in which the error detection circuit 125 marks the current video block within the error memory 127 for spatial error concealment. As previously discussed, in one embodiment marking involves programming values or flags in the error memory 127 for use by the error concealment circuit 117. If there are no errors in the current video block, or after the erroneous video block is marked, operation proceeds to block 413 to inquire whether the current IDR or I-slice has been decoded and is done. If not, operation loops back to block 407 to begin decoding the next intraframe encoded video block of the slice. Operation loops between blocks 407-413 until decoding of the current IDR slice or I-slice is done, and operation is completed for the IDR slice or I-slice.

Referring back to block 405, if the current slice is not an IDR or I-slice, operation proceeds instead to block 415 in which the next video block within the current slice is decoded. While decoding the next video block, operation proceeds to block 417 to inquire whether the error detection circuit 125 detects an error in the video block. As previously described, the error detection circuit 125 performs interframe and intraframe error detection during the decoding process of each video block. If an error is detected in the video block as determined at block 417, operation proceeds to block 419 to inquire whether the video block is intraframe encoded. If the erroneous video block is intraframe encoded, operation proceeds to block 421 in which the error detection circuit 125 marks the current video block within the error memory 127 for spatial error concealment. If there are no errors in the current video block as determined at block 417, then operation proceeds to block 418 to inquire whether the video block is a SKIP type video block and whether the SC value is provided indicating a scene change. If the video block is type SKIP and if the SC value is provided indicating a scene change as determined at block 418, then the video block is considered LOST and operation proceeds to block 421 in which the error detection circuit 125 marks the LOST video block within the error memory 127 for spatial error concealment. If the video block is not type SKIP or if SC is not provided as determined at block 418, or after the erroneous video block is marked for spatial error concealment at block 421, operation proceeds to block 423 to inquire whether the current slice has been completely decoded and is done. If so, operation is complete. If decoding of the slice has not been completed, operation loops back to block 415 to decode the next video block in the current slice.

Referring back to block 419, if the current video block is not intraframe encoded, then operation proceeds instead to block 425 to inquire whether the SC value has been provided (e.g., SC flag is set) indicating a scene change. For each new frame, the scene change detection circuit 129 tracks statistical information by counting the number of intraframe and interframe encoded video blocks of the current frame. When the percentage of intraframe encoded video blocks reaches the threshold TH1 (after a predetermined minimum amount of the frame has been decoded) as previously described, then the SC value is provided. If the SC value is provided as determined at block 425, then operation proceeds to block 427 to inquire whether the video block is a LOST video block. If so, operation proceeds to block 421 to mark the LOST video block for spatial error concealment. Otherwise, if the current video block is not a LOST video block as determined at block 427, then the current video block is determined to be interframe encoded and operation proceeds to block 429 to inquire whether the INTERVB value is provided. If the INTERVB value is not provided as determined at block 429, then the current frame has a relatively low number of interframe encoded video blocks which indicates that the interframe encoding determination may be erroneous. When the INTERVB value is not provided, operation proceeds to block 421 to mark the video block for spatial error concealment. Otherwise, if the INTERVB value is provided as determined at block 429 indicating that the interframe encoding determination is most likely correct, then operation proceeds to block 433 in which the error detection circuit 125 marks the current video block within the error memory 127 for temporal error concealment. After the erroneous video block is marked at block 433, operation proceeds to block 423 to inquire whether the current slice has been decoded and is done. If so, operation is complete. If decoding of the slice is has not been completed, operation loops back to block 415 to decode the next video block in the current slice.

Figure 5:
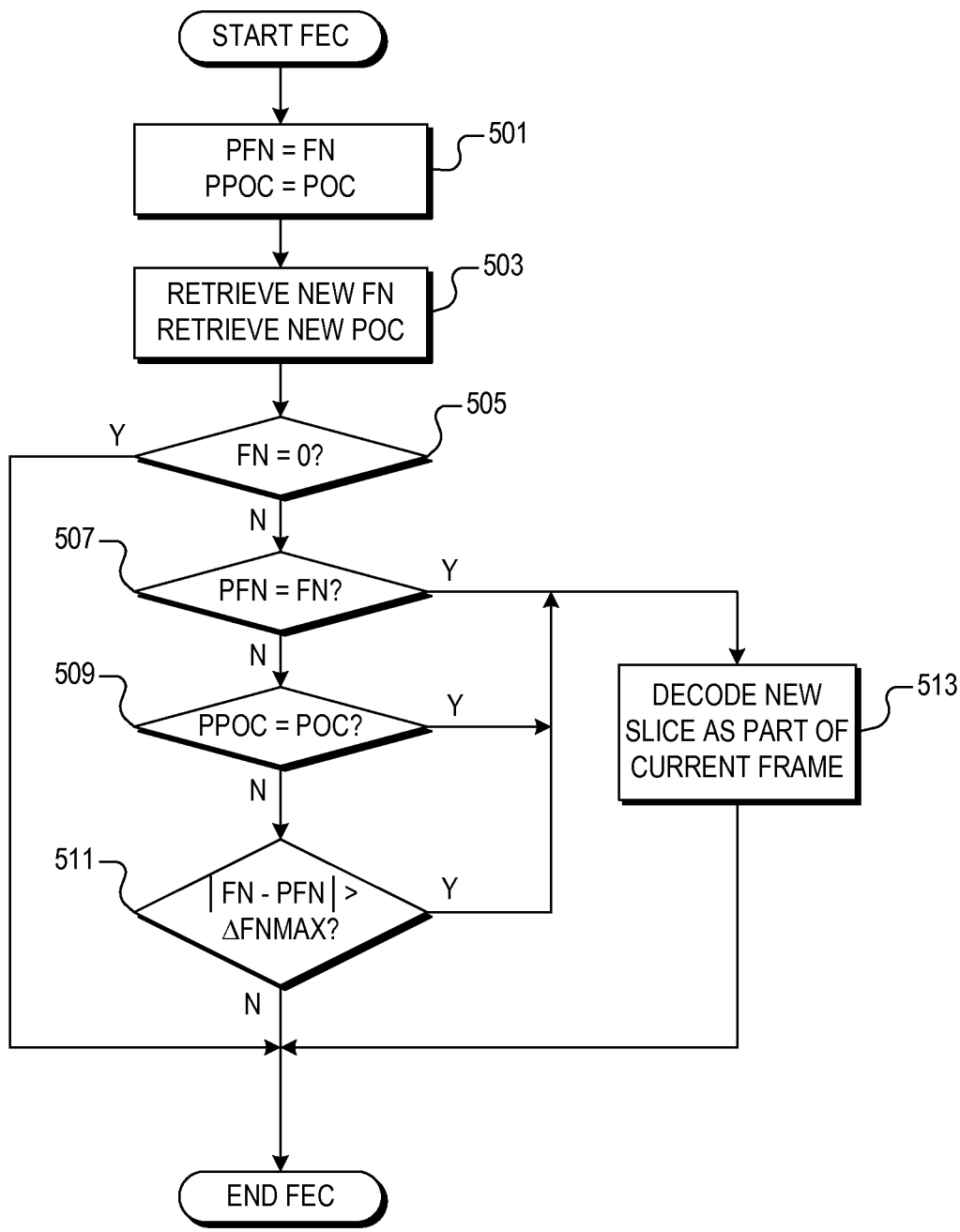
FIG. 5 is a flowchart diagram illustrating operation of the frame error circuit of FIG. 1 for performing frame error concealment.

FIG. 5 is a flowchart diagram illustrating operation of the frame error circuit 135 for performing frame error concealment at block 403 of FIG. 4. At first block 501, the frame number FN and the picture order count POC of the previous slice are set equal to values PFN and PPOC, respectively, to store the FN and POC of the previous slice. At next block 503, the new FN and POC values are retrieved from the slice header of the new slice (which is now the current slice). At next block 505 it is inquired whether FN is 0 for the new slice. When FN is 0, such as for an IDR slice, then frame error concealment is not performed and operation is completed. Otherwise, when FN is not 0 for the new slice, operation proceeds to each of sequential blocks 507, 509 and 511 to test the conditions for frame error concealment for the new slice. When PFN=FN (when the previous frame number is equal to the new frame number as determined at block 507), or when PPOC=POC (when the previous picture order count is equal to the new picture order count as determined at block 509), or when the difference (absolute value) between FN and PFN is greater than ΔFNMAX (as determined at block 511), then operation proceeds to block 513 in which the new slice is decoded as part of the current frame rather than being part of a new frame. After block 513, or when none of the conditions of blocks 507, 509 and 511 is met, then operation is completed.

Figure 6:
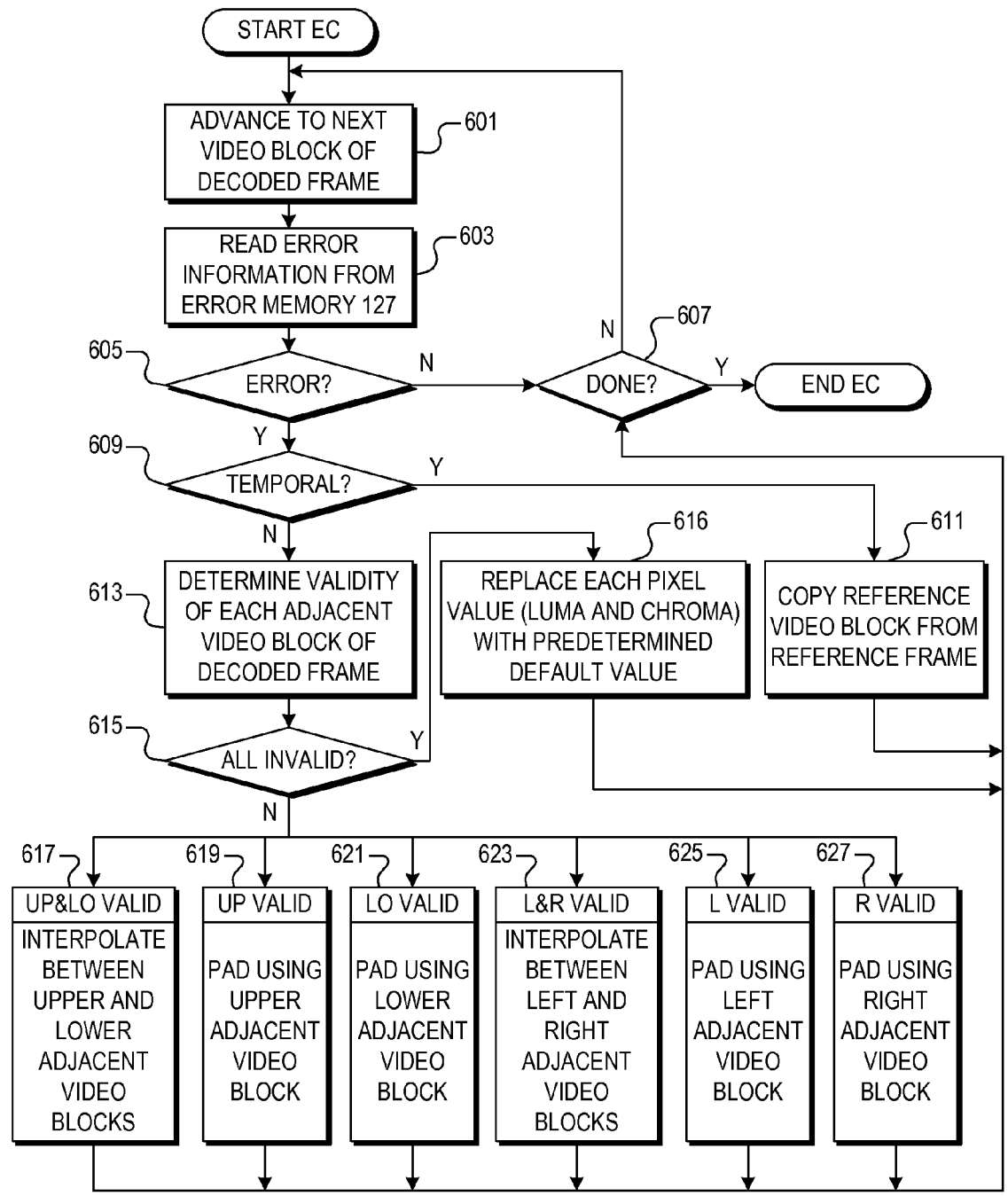
FIG. 6 is a flowchart diagram illustrating operation of the error concealment circuit of FIG. 1 according to one embodiment.

FIG. 6 is a flowchart diagram illustrating operation of the error concealment circuit 117 according to one embodiment. The error concealment circuit 117 is shown as a post processing circuit which conceals errors of erroneous video blocks of a decoded frame stored in the RF storage 115. At a first block 601, the error concealment circuit 117 advances to the first or next video block of the decoded frame. At next block 603, the error concealment circuit 117 reads error information of the corresponding video block from the error memory 127. Operation advances to block 605 in which it is queried whether the video block is indicated as having an error. If not, operation proceeds to block 607 to determine whether error concealment for the frame is complete. In the first iteration, error concealment operation is not complete so that operation returns to block 601 to advance to the next video block of the frame. Referring back to block 605, if the video block is erroneous, then operation proceeds instead to block 609 to inquire whether error concealment for the erroneous video block is indicated as temporal. If so, operation proceeds to block 611 in which the error concealment circuit 117 performs temporal error concealment by rejecting the erroneous video block and replacing it with a reference video block from a reference frame. The reference video block from the reference frame is either a co-located video block or a video block within the reference frame pointed to by a corresponding motion vector. In effect, the reference video block from the reference frame is copied into the frame at the location of the erroneous video block. Temporal concealment is performed for interframe video blocks in which the decoding process uses one or more previously decoded video frames for decoding the current frame. After temporal concealment in block 611 is completed, operation proceeds to block 607 to inquire whether the frame is done.

Referring back to block 609, if the error concealment method is spatial rather than temporal, operation proceeds to block 613 in which the error concealment circuit 117 determines the validity of video blocks adjacent to the erroneous video block. The adjacent video blocks include an upper video block immediately above the erroneous video block in the decoded frame, a lower video block immediately below the erroneous video block in the frame, a left video block immediately to the left of the erroneous video block in the frame, and a right video block immediately to the right of the erroneous video block in the frame. An adjacent video block is "invalid" if it is not within the frame, such as when the current video block is along an edge of the frame, or if the video block was also flagged as being erroneous by the error detection circuit 125. Operation advances to block 615 to inquire whether all of the adjacent video blocks are invalid. When all of the adjacent video blocks are invalid, operation proceeds to block 616 in which each pixel value (e.g., chroma and luma) is set equal to a predetermined default value, and then operation returns to block 607. In one embodiment, the predetermined default value used in block 616 is 128, although any suitable default value may be used. If at least one of the adjacent video blocks is valid, then operation advances depending upon which are valid. If the upper (UP) and lower (LO) adjacent video blocks are both valid, then operation advances to block 617 in which the erroneous video block is interpolated between the upper and lower adjacent video blocks as further described below. If the upper adjacent video block is valid but the lower one is not, then operation advances to block 619 in which the erroneous video block is concealed by padding from the upper adjacent video block as further described below. If the lower adjacent video block is valid but the upper one is not, then operation advances to block 621 in which the erroneous video block is concealed by padding from the lower adjacent video block as further described below.

If the upper and lower adjacent video blocks are both invalid and the left and right (L&R) adjacent video blocks are both valid, then operation proceeds instead to block 623 in which the erroneous video block is interpolated between the left and right adjacent video blocks as further described below. If the upper and lower and right adjacent video blocks are invalid and the left (L) adjacent video block is valid, then operation proceeds instead to block 625 in which the erroneous video block is concealed by padding from the left adjacent video block as further described below. If the upper and lower and left adjacent video blocks are invalid and the right (R) adjacent video block is valid, then operation proceeds instead to block 627 in which the erroneous video block is concealed by padding from the right adjacent video block as further described below. After any of the blocks 617-627, operation returns to block 607 to determine whether error concealment for the frame is completed. At block 601, operation advances one video block at a time for the entire frame during error concealment. The video blocks may be processed in any suitable order such as from top to bottom or bottom to top and/or from left to right or right to left or any other suitable process ordering. At block 607 it is queried whether there are any further video blocks to be processed. If so, operation returns to block 601 to process the next video block. If not, error concealment operation is complete.

Figure 7:
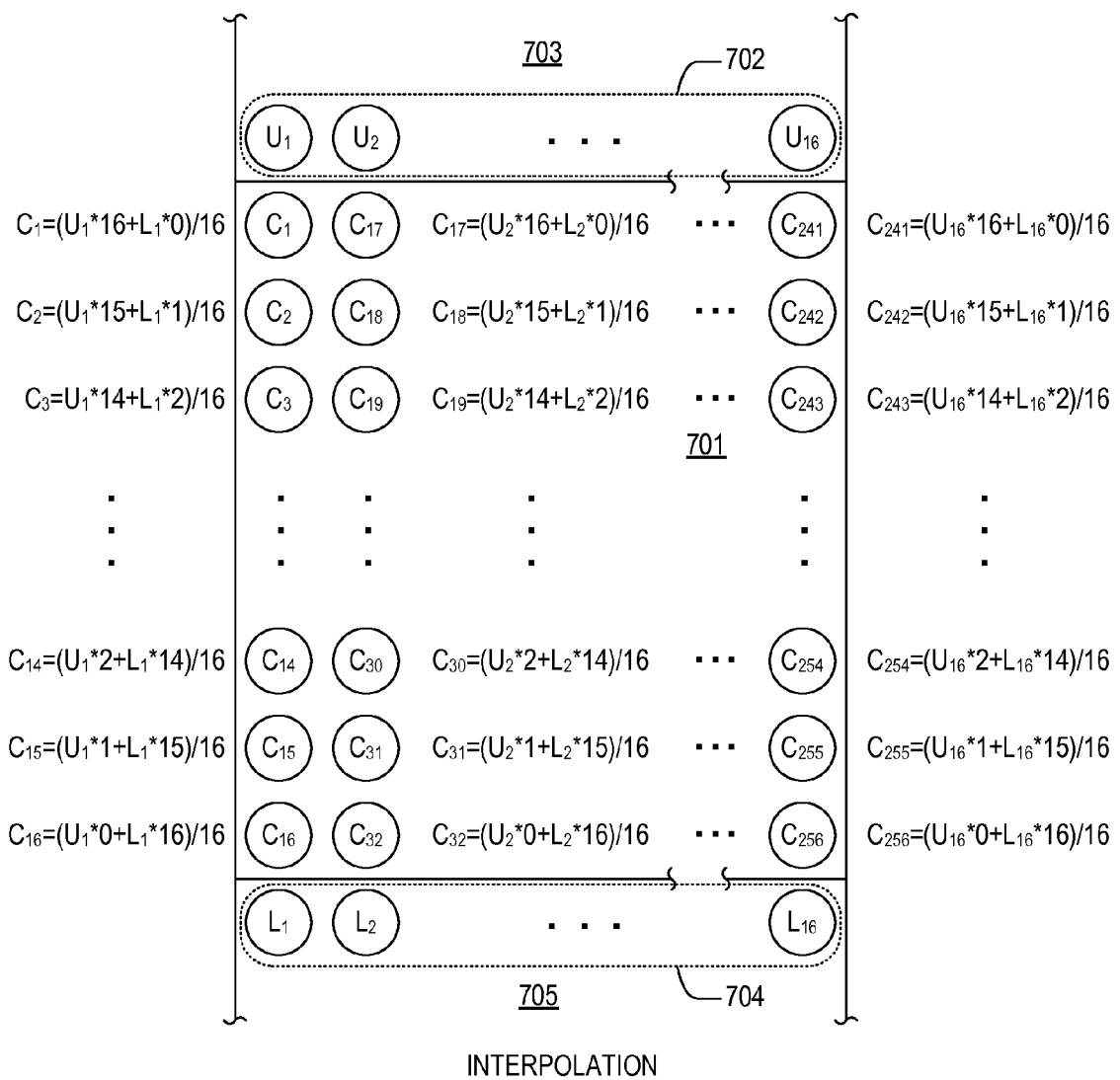
FIG. 7 is a figurative block diagram illustrating spatial error concealment of an erroneous video block by interpolation of "pixel" values.

FIG. 7 is a figurative block diagram illustrating spatial error concealment of an erroneous video block 701 by interpolation of "pixel" values between an adjacent upper video block 703 and an adjacent lower video block 705 located above and below, respectively, the erroneous video block 701. The video blocks 701-705 are depicted as 16×16 video blocks with 256 pixel values each, where it is understood that any size video block is contemplated. The pixel values include the 16×16 luma values for the luma blocks, where it is understood that the same process is employed for each 8×8 Cr chroma block and each 8×8 Cb chroma block. As shown, the erroneous video block 701 includes 256 pixels with corresponding pixel values $C_1, C_2, \ldots, C_{256}$ ($C_1$-$C_{256}$). The left column of the erroneous video block 701 includes pixel values $C_1$-$C_{16}$, the next column to the right includes pixel values $C_{17}$-$C_{32}$ and so on up to the last column on the right including pixel values $C_{241}$-$C_{256}$. In the illustrated embodiment, interpolation is performed column by column across the erroneous video block 701 using a lowest pixel row 702 of the upper video block 703 and a highest pixel row 704 of the lower video block 705. The pixel row 702 includes pixel values $U_1, U_2, \ldots, U_{16}$ ($U_1$-$U_{16}$) and the pixel row 704 includes pixel values $L_1, L_2, \ldots, L_{16}$ ($L_1$-$L_{16}$).

The first column of pixel values $C_1$-$C_{16}$ of the erroneous video block 701 is interpolated using the aligned pixel values $U_1$ from the adjacent upper video block 703 and $L_1$ from the adjacent lower video block 705 based on relative position. The upper-left pixel value $C_1$ is calculated as $C_1=(U_1*16+L_1*0)/16$, or 16 parts of $U_1$ and 0 part of $L_1$, which means that $C_1$ is a duplicate of $U_1$. The next lower pixel value $C_2$ just below $C_1$ in the same column is calculated as $C_2=(U_1*15+L_1*1)/16$, or 15 parts of $U_1$ and 1 part of $L_1$. Thus, $C_2$ is mostly derived from $U_1$ with a small portion of $L_1$. The next lower pixel value $C_3$ just below $C_2$ in the same column is calculated as $C_3=(U_1*14+L_1*2)/16$, or 14 parts of $U_1$ and 2 parts of $L_1$. Thus, $C_3$ is also mostly derived from $U_1$ with a small contribution of $L_1$, except with slightly greater portion of $L_1$ as compared to $C_2$. Thus, the contribution of $U_1$ decreases while the contribution of $L_1$ increases while progressing down the column away from $U_1$ and towards $L_1$. Calculation proceeds in similar manner down the left-most column. As shown, the pixel value $C_{14}$ near the lower-left portion of the frame 701 along the same column is calculated as $C_{14}=(U_1*2+L_1*14)/16$, or 2 parts of $U_1$ and 14 parts of $L_1$. Since pixel value $C_{14}$ is significantly closer to $L_1$ as compared to $U_1$, $C_{14}$ includes a greater portion of $L_1$. The pixel value $C_{15}$ is 15 parts $L_1$ and only 1 part $U_1$, thus mostly derived from $L_1$ which is opposite or reverse the case of $C_2$. Finally, the last pixel value $C_{16}$ of the left-most column is 16 parts $L_1$ and 0 part $U_1$, so that $C_{16}$ is a duplicate of $L_1$.

Each pixel of the next column of pixel values $C_{17}$-$C_{32}$ is interpolated in similar manner using the aligned pixel values $U_2$ from the adjacent upper video block 703 and $L_2$ from the adjacent lower video block 705 based on relative position. Thus, the top pixel value $C_{17}$ in the second column is calculated as $C_{17}=(U_2*16+L_2*0)/16$, or 16 parts of $U_2$ and 0 part of $L_2$, which means that $C_{17}$ is a duplicate of $U_2$. The next lower pixel value $C_{18}$ just below $C_{17}$ is 15 parts of $U_2$ and 1 part of $L_2$, and so on down to the lowest pixel value $C_{32}$ in the same column, which is 16 parts $L_2$ and 0 parts $U_2$. Calculation is similar for each column to the last column of pixel values $C_{241}$-$C_{256}$ interpolated using pixel values $U_{16}$ from the adjacent upper video block 703 and $L_{16}$ from the adjacent lower video block 705. Although the calculations were described from top to bottom for each column going column-by-column from left to right across the erroneous video block 701, the calculations may be performed in any order. Interpolation between an adjacent left video block and an adjacent right video block is conducted in substantially similar manner except using the right-most pixel line of the left video block and the left-most pixel line of the right video block with interpolation row by row using aligned pixel values. For example, if the block diagram of FIG. 7 is rotated 90 degrees clockwise so that the upper video block is positioned on the right and the lower video block is positioned on the left, interpolation is substantially the same except using the aligned pixel values of the left and right aligned video blocks on a row-by-row basis. In general, interpolation is performed by combining relative portions of aligned pixel values of adjacent video blocks on either side of a pixel row or pixel column based on relative position within the erroneous video block.

Interpolation is illustrated using a 16×16 video block of pixel values, where it is understood that interpolation may be performed on any size video block. Each 16×16 video block includes 16×16 luma values, 8×8 blue color difference chroma values (Cb), and 8×8 red color difference chroma values (Cr). The 16×16 block of luma values and each 8×8 block of chroma values are interpolated in the same manner using aligned values (luma or chroma) in adjacent video blocks on either side of the erroneous video block to derive the corresponding (luma or chroma) error concealment values.

Figure 8:
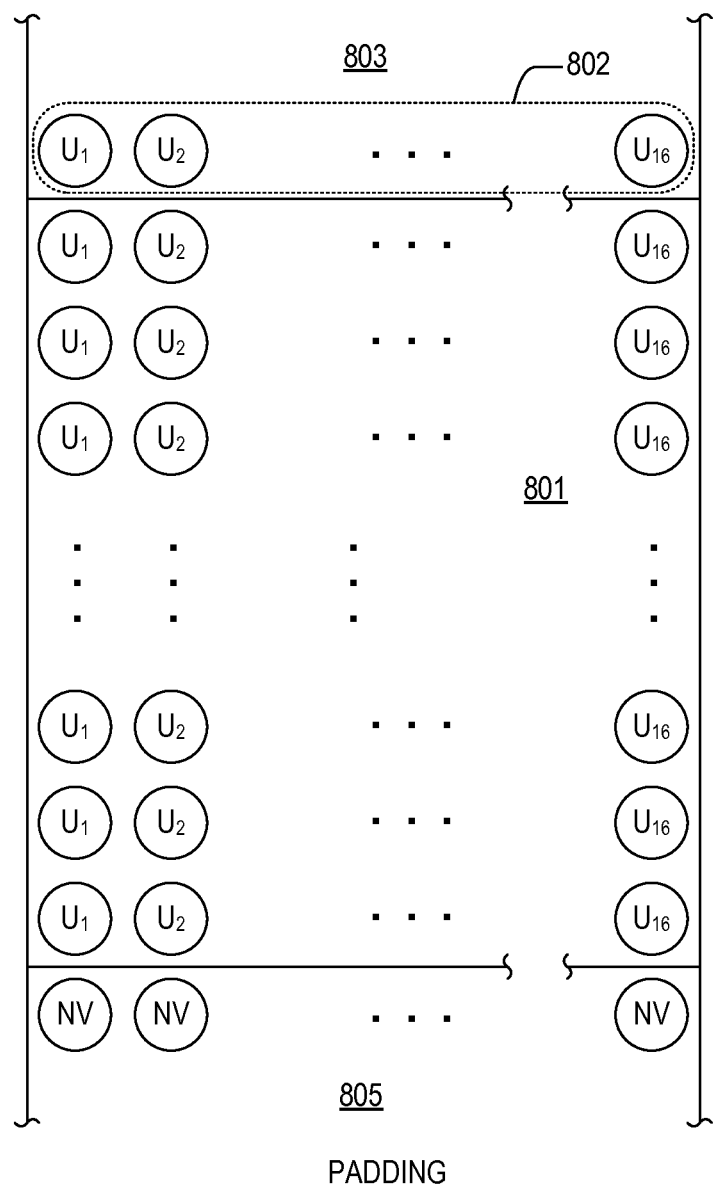
FIG. 8 is a figurative block diagram illustrating spatial error concealment of an erroneous video block by padding of pixel values from an adjacent video block.

FIG. 8 is a figurative block diagram illustrating spatial error concealment of an erroneous video block 801 by padding of pixel values from an adjacent upper video block 803 when an adjacent lower video block 805 is invalid. Again, the video blocks 801-805 are depicted as 16×16 video blocks with 256 pixel values, where it is understood that any size video block is contemplated. The pixel values include the 16×16 luma values for the luma blocks, where it is understood that the same process is employed for each 8×8 Cr chroma block and each 8×8 Cb chroma block. Since the lower video block 805 is invalid, the pixel values located within the adjacent top row of the lower video block 805 are marked as "NV" denoting "not valid". It is noted that if the video block 801 is along the bottom edge of the frame, then the lower video block 805 is invalid because it does not exist. The erroneous video block 801 includes 256 pixels in a similar manner as the erroneous video block 701. In the illustrated embodiment, padding is performed column by column across the erroneous video block 801 by copying aligned pixel values from only a lowest pixel row 802 of the upper video block 803. The pixel row 802 includes pixel values $U_1$-$U_{16}$ in a similar manner as the pixel row 702. In this case, each column of the erroneous video block 801 is padded with the aligned pixel value from the pixel row 802 of the upper video block 803. As shown, the pixel value $U_1$ from the pixel row 802 of the upper video block 803 is copied into each pixel value of the entire left column of the video block 801, the next pixel value $U_2$ from the pixel row 802 is copied into each pixel value of the second column of the video block 801, and so on to the last or right-most column of the video block 801, in which the last pixel value $U_{16}$ of the pixel row 802 is copied into each pixel value of the entire right column of the video block 801.

Padding from alternative adjacent video blocks is performed in substantially the same manner. For example, padding from a lower adjacent video block, such as the lower video block 805, if valid, is achieved column by column across the erroneous video block 801 by copying aligned pixel values from the upper pixel row of the adjacent lower video block. Padding from a left adjacent video block is achieved row by row across the erroneous video block 801 by copying aligned pixel values from the right-most pixel row of the adjacent left video block. Padding from a right adjacent video block is achieved row by row across the erroneous video block 801 by copying aligned pixel values from the left-most pixel row of the adjacent right video block.

In the illustrated embodiment the error detection circuit 125 determines the method of error concealment between spatial and temporal based on scene evaluation parameters including the SC (scene change) and INTERVB (relative number of interframe encoded VBs) flags during the decoding process. Also, the scene change and evaluation determination is not made until at least a certain portion of the current frame has been decoded. Thus, an early scene change determination may potentially be changed one or more times while decoding the same frame. In an alternative embodiment, the error detection circuit 125 does not determine the error concealment for each video block until decoding is completed or near completed for the current frame. In one embodiment both of the scene evaluation flags are evaluated in the same manner, except based on the statistics for most or all of the current frame. In another embodiment, a selected one of the scene determinations is used, or an alternative threshold is evaluated, based on the decoding statistics of most or all of the current frame. In either case, a more accurate scene evaluation determination is made based on information from most or all of the current frame rather than only a portion of the frame. Since the scene change determination is more accurate, the error concealment decision is likely to be more accurate as well.

In one alternative embodiment, the SC and INTERVB flags are not evaluated for each video block during frame decoding but instead are evaluated after the entire frame is decoded. The first method as described in FIG. 4 provides more distributed processing over decoding time for each frame but results in increased processing since the SC and INTERVB values are evaluated during the decoding of each video block. The alternative method results in somewhat more processing at the end of the frame but less overall processing since the SC and INTERVB values are evaluated only once at the end of frame decoding if the frame is marked as an erroneous frame. Such post-processing also potentially results in a more accurate scene change and error concealment determination. After frame decoding is completed, the error detection circuit 125 determines error concealment and programs the error memory 127 for each video block after the frame is decoded and before the error concealment circuit 117 performs spatial and temporal error concealment.

A method of decoding input video information according to one embodiment includes performing error detection for each video block of a frame, determining whether a scene change occurs for the frame, and when an error is detected in a video block of the frame, performing spatial concealment of the erroneous video block when the erroneous video block is intraframe encoded or when a scene change is detected for the frame, or performing temporal concealment of the erroneous video block when the erroneous video block is interframe encoded and when a scene change is not detected for the frame.

The method of determining a scene change may include determining whether an amount of intraframe mode video blocks achieves a predetermined percentage of the frame or achieves a predetermined threshold. If the erroneous video block is determined to be interframe encoded, spatial concealment may be performed for the erroneous video block if a scene change is detected for the frame and the number of interframe mode video blocks divided by the total number of decoded video blocks has not achieved a predetermined threshold. Otherwise, temporal concealment may be performed for the erroneous video block if a scene change is detected for the frame and the number of interframe mode video blocks divided by the total number of decoded video blocks has achieved the predetermined threshold.

The method may further include detecting an error of the input video information, receiving a new frame number from a new video slice, and decoding the new video slice as part of a current frame when an error of the input video information is detected and when a prior frame number is not zero and is equal to the new frame number. The method may further include receiving a new picture order count from the new video slice, and decoding the new video slice as part of a current frame when an error of the input video information is detected and when the prior frame number is not zero and a prior picture order count is equal to the new picture order count. The method may further include decoding the new video slice as part of a current frame when an error of the input video information is detected and when the new frame number is not zero and when a difference between the prior frame number and the new frame number is greater than a predetermined maximum number.

Spatial concealment may be performed by interpolating pixel values across the erroneous video block by combining relative portions of first and second aligned pixel values of adjacent video blocks within the frame based on relative position within the erroneous video block. If only one adjacent video block is valid, spatial concealment may be performed by copying an aligned pixel value of an adjacent video block across the erroneous video block.

An error detection and concealment system for a video decoder which decodes each video block of a frame of input video information based on encoding type includes a scene change detection circuit, an error detection circuit, and an error concealment circuit. The scene change detection circuit determines scene change for the frame based on relative amount of intraframe type video blocks. The error detection circuit indicates whether there is an error in each video block. The error concealment circuit performs spatial concealment for an erroneous video block when the erroneous video block is intraframe encoded or when a scene change is detected for the frame, and performs temporal concealment of the erroneous video block when the erroneous video block is interframe encoded and when a scene change is not detected for the frame.

The scene change detection circuit may include a tracking circuit which tracks the relative amount of intraframe type video blocks and a comparator circuit which detects a scene change when an amount of intraframe type video blocks achieves a first predetermined threshold. The tracking circuit may further track a relative amount of interframe type video blocks and the comparator circuit may detect when the amount of interframe type video blocks achieves a second predetermined threshold. The error concealment circuit may perform spatial concealment for the erroneous video block when a scene change is detected for the frame, when the erroneous video block is interframe encoded, and when the amount of interframe type video blocks does not achieve the second predetermined threshold. The error concealment circuit may perform temporal concealment for the erroneous video block when a scene change is detected for the frame, when the erroneous video block is interframe encoded, and when the amount of interframe type video blocks achieves the second predetermined threshold.

The error detection and concealment system may further include a frame error concealment circuit which receives a new frame number and a new picture order count from a new video slice, and which, when an error is detected in the input video information, indicates that the new video slice is to be decoded as part of the frame when a prior frame number is not zero and is equal to the new frame number, when the prior frame number is not zero and a prior picture order count is equal to the new picture order count, or when the new frame number is not zero and when a difference between the prior frame number and the new frame number is greater than a predetermined maximum number.

A video decoder according to one embodiment includes a video decoder circuit, an error memory, an error detection circuit, and error concealment circuit. The video decoder circuit decodes video blocks of a frame based on encoding type. The scene change detection circuit determines whether a scene change is occurring for the frame based on relative amount of intraframe and interframe type video blocks. The error detection circuit programs the error memory to indicate whether there is an error in each video block and a type of error concealment between spatial error concealment and temporal error concealment based on video block type and whether a scene change is occurring. The error concealment circuit performs spatial concealment for an erroneous video block by incorporating neighboring video information within the frame when the erroneous video block is intraframe encoded or when a scene change is detected for the frame, and performs temporal concealment by replacing the erroneous video block with a reference video block from a reference frame when the erroneous video block is interframe encoded and when a scene change is not detected for the frame.

The error concealment circuit may perform spatial concealment for the erroneous video block when a scene change is detected for the frame, when the erroneous video block is interframe encoded and when a relative amount of interframe encoded video blocks does not achieve a predetermined threshold. The error concealment circuit may perform temporal concealment for the erroneous video block when a scene change is detected for the frame, when the erroneous video block is interframe encoded, and when the relative amount of interframe encoded video blocks achieves the predetermined threshold. The video decoder may further include a frame error concealment circuit which receives a new frame number and a new picture order count from a new video slice, and which, after detecting an error of input video information, causes the video decoder circuit to decode the new video slice as part of the frame when a prior frame number is not zero and is equal to the new frame number, when the prior frame number is not zero and a prior picture order count is equal to the new picture order count, or when the new frame number is not zero and when a difference between the prior frame number and the new frame number is greater than a predetermined maximum number.

Although the present invention has been described in considerable detail with reference to certain preferred versions thereof, other versions and variations are possible and contemplated. For example, circuits or logic blocks described herein may be implemented as discrete circuitry or integrated circuitry or software or any alternative configurations. Also, although the present invention has been described herein with respect to video information, it is appreciated that the present invention applies more generally to any "image information", such as video (e.g. MPEG and the like). The term "image information" as used herein is intended to apply to any video or image or image sequence information. Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:

1. A method of decoding input video information, comprising:
    performing error detection for each video block of a frame;
    determining whether a scene change occurs for the frame;
    tracking a relative amount of interframe mode video blocks for the frame;
    determining error concealment for the frame on a block-by-block basis, comprising:
        when an error is detected in a video block of the frame, determining spatial concealment of the erroneous video block when the erroneous video block is intraframe encoded, or when a scene change is detected for the frame and the relative amount of interframe mode video blocks does not achieve a first predetermined threshold, and otherwise determining temporal concealment of the erroneous video block; and
        enabling spatial concealment and temporal concealment to be determined within the same frame.

2. The method of claim 1, wherein said determining whether a scene change occurs for the frame comprises determining whether an amount of intraframe mode video blocks achieves a predetermined percentage of the frame.

3. The method of claim 1, wherein said determining whether a scene change occurs for the frame comprises determining that a number of intraframe mode video blocks divided by a total number of decoded video blocks achieves a second predetermined threshold.

4. The method of claim 1, further comprising:
    detecting an error of the input video information;
    receiving a new frame number from a new video slice; and
    decoding the new video slice as part of a current frame when an error of the input video information is detected and when a prior frame number is not zero and is equal to the new frame number.

5. The method of claim 1, further comprising:
    detecting an error of the input video information;
    receiving a new frame number and a new picture order count from a new video slice; and
    decoding the new video slice as part of a current frame when an error of the input video information is detected and when the prior frame number is not zero and a prior picture order count is equal to the new picture order count.

6. The method of claim 1, further comprising:
   detecting an error of the input video information;
   receiving a new frame number from a new video slice; and
   decoding the new video slice as part of a current frame when an error of the input video information is detected, when the new frame number is not zero and when a difference between the prior frame number and the new frame number is greater than a predetermined maximum number.

7. The method of claim 1, further comprising performing spatial concealment comprising interpolating pixel values across the erroneous video block by combining relative portions of first and second aligned pixel values of adjacent video blocks within the frame based on relative position within the erroneous video block.

8. The method of claim 1, wherein said performing spatial concealment comprises padding pixel values by copying an aligned pixel value of an adjacent video block within the frame across the erroneous video block.

9. The method of claim 1, further comprising performing spatial concealment comprising:
   when an upper adjacent video block and a lower adjacent video block of an erroneous video block are both valid within the frame, interpolating pixel values across the erroneous video block between a lower pixel line of the upper adjacent video block and an upper pixel line of the lower adjacent video block; and
   when only one of the upper adjacent video block and the lower adjacent video block is valid within the frame, padding pixel values across the erroneous video block based on an adjacent pixel line of the valid adjacent video block.

10. The method of claim 9, wherein said performing spatial concealment further comprises:
    when the upper adjacent video block and the lower adjacent video block are both invalid and a left adjacent video block and a right adjacent video block of the erroneous video block are both valid, interpolating pixel values across the erroneous video block between a right pixel line of the left adjacent video block and a left pixel line of the right adjacent video block; and
    when only one of the right adjacent video block and the left adjacent video block is valid, padding pixel values across the erroneous video block based on an adjacent pixel line of the valid adjacent video block.

11. An error detection and concealment system for a video decoder which is configured to decode each video block of a frame of input video information based on encoding type, said error detection and concealment system comprising:
    a scene change detection circuit which is configured to determine a scene change for the frame based on relative amount of intraframe type video blocks;
    a tracking circuit which is configured to track a relative amount of interframe type video blocks;
    an error detection circuit which is configured to indicate whether there is an error in each video block and to determine error concealment for the frame on a block-by-block basis, wherein said error concealment circuit is configured to determine spatial concealment for an erroneous video block when said erroneous video block is intraframe encoded, or when a scene change is detected for the frame and said relative amount of interframe mode video blocks does not achieve a first predetermined threshold, and which is configured to otherwise determine temporal concealment of said erroneous video block; and
    wherein said error detection circuit is configured to determine spatial concealment and temporal concealment within the same frame.

12. The error detection and concealment system of claim 11, wherein:
    said tracking circuit tracks said relative amount of intraframe type video blocks; and
    wherein said scene change detection circuit comprises a comparator circuit which detects a scene change when an amount of intraframe type video blocks achieves a second predetermined threshold.

13. The error detection and concealment system of claim 11, further comprising a frame error concealment circuit which receives a new frame number and a new picture order count from a new video slice, and which, when an error is detected in the input video information, indicates that said new video slice is to be decoded as part of the frame when a prior frame number is not zero and is equal to said new frame number, when said prior frame number is not zero and a prior picture order count is equal to said new picture order count, or when said new frame number is not zero and when a difference between said prior frame number and said new frame number is greater than a predetermined maximum number.

14. The error detection and concealment system of claim 11, further comprising an error concealment circuit which performs said spatial concealment by either interpolating pixel values between valid adjacent video blocks on either side of said erroneous video block or by padding pixel values from one valid adjacent video block.

15. The error detection and concealment system of claim 14, wherein said error concealment circuit performs interpolation by combining relative portions of first and second aligned pixel values based on relative position within said erroneous video block, and wherein said error concealment circuit performs padding by copying an aligned pixel value across said erroneous video block.

16. A video decoder, comprising:
    a video decoder circuit which is configured to decode video blocks of a frame based on encoding type;
    a scene change detection circuit which is configured to determine whether a scene change is occurring for said frame based on relative amount of intraframe encoded video blocks;
    an error memory;
    a tracking circuit which is configured to track a relative amount of interframe encoded video blocks;
    an error detection circuit which is configured to determine error concealment type for said frame on a block-by-block basis and to program said error memory to indicate whether there is an error in each video block and a type of error concealment between spatial error concealment and temporal error concealment based on video block encoding type and whether a scene change is occurring; and
    an error concealment circuit which is configured to perform spatial concealment for an erroneous video block by incorporating neighboring video information within said frame when said erroneous video block is intraframe encoded, or when a scene change is detected for the frame and said relative amount of interframe encoded video blocks does not achieve a predetermined threshold, and which otherwise is configured to perform temporal concealment by replacing said erroneous video block with a corresponding video block from a reference frame;

wherein said error concealment circuit is configured to perform both spatial concealment and temporal concealment within said frame.

17. The video decoder of claim 16, further comprising a frame error concealment circuit which receives a new frame number and a new picture order count from a new video slice, and which, after detecting an error of input video information, causes said video decoder circuit to decode said new video slice as part of the frame when a prior frame number is not zero and is equal to said new frame number, when said prior frame number is not zero and a prior picture order count is equal to said new picture order count, or when said new frame number is not zero and when a difference between said prior frame number and said new frame number is greater than a predetermined maximum number.

18. The method of claim 1, while decoding a frame of the input video information, further comprising:
- counting a number of video blocks received for decoding so far in the frame and providing a video block count;
- counting a number of intraframe mode video blocks received for decoding so far in the frame and providing an intraframe count;
- counting a number of interframe mode video blocks received for decoding so far in the frame and providing an interframe count;
- determining that an erroneous video block is a lost video block when its coding mode is unknown; and
- when the video block count achieves a predetermined percentage of the frame, providing a scene change indication when the intraframe count divided by the video block count achieves a first predetermined threshold, and providing an intermode indication when the interframe count divided by the video block count achieves a second predetermined threshold;
- said determining spatial concealment comprising determining spatial concealment of the erroneous video block when the erroneous video block is intraframe encoded, or when the scene change indication is provided and the erroneous video block is a lost video block, or when the erroneous video block is interframe encoded when the scene change indication is provided and the intermode indication is not provided; and
- said determining temporal concealment comprising determining temporal concealment of the erroneous video block when the erroneous video block is not intraframe encoded and the scene change indication is not provided, or when the erroneous video block is interframe encoded and the scene change indication and the interframe indication are both provided.

19. The error detection and concealment system of claim 11, wherein:
- said tracking circuit is configured to count a number of video blocks received for decoding so far in the frame and to provide a video block count indicative thereof, to count a number of intraframe mode video blocks received for decoding so far in the frame and to provide an intraframe count indicative thereof, to count a number of interframe mode video blocks received for decoding so far in the frame and to provide an interframe count indicative thereof, and to determine whether a video block is a lost video block when its coding mode is unknown;
- wherein said scene change detection circuit comprises a comparator circuit which is configured to provide a scene change indication when said intraframe count divided by said video block count achieves a first predetermined threshold after said video block count has achieved a predetermined percentage of the frame, and to provide an intermode indication when said interframe count divided by said video block count achieves a second predetermined threshold after said video block count has achieved a predetermined percentage of the frame;
- wherein said error detection circuit is configured to determine spatial concealment of said erroneous video block when said erroneous video block is intraframe encoded, or when said erroneous video block is a lost video block and said scene change indication is provided, or when said erroneous video block is interframe encoded when said scene change indication is provided and said intermode indication is not provided; and
- wherein said error concealment circuit is further configured to determine temporal concealment of said erroneous video block when said erroneous video block is not intraframe encoded and said scene change indication is not provided, or when said erroneous video block is interframe encoded and said scene change indication and said interframe indication are both provided.

20. The video decoder of claim 16, wherein:
- said tracking circuit is configured to count a number of video blocks received for decoding so far in the frame and provides a video block count, to count a number of intraframe mode video blocks received for decoding so far in the frame and provides a corresponding intraframe count, to count a number of interframe mode video blocks received for decoding so far in the frame and provides a corresponding interframe count, and to determine whether a video block is a lost video block when its coding mode is unknown;
- wherein said scene change detection circuit comprises a comparator circuit which is configured to provide a scene change indication when said intraframe count divided by said video block count achieves a first predetermined threshold after said video block count has achieved a predetermined percentage of the frame, and to provide an intermode indication when said interframe count divided by said video block count achieves a second predetermined threshold after said video block count has achieved a predetermined percentage of the frame;
- wherein said error concealment circuit is configured to perform spatial concealment of said erroneous video block when said erroneous video block is intraframe encoded, or when said erroneous video block is a lost video block and said scene change indication is provided, or when said erroneous video block is interframe encoded when said scene change indication is provided and said intermode indication is not provided; and
- wherein said error concealment circuit is further configured to perform temporal concealment of said erroneous video block when said erroneous video block is not intraframe encoded and said scene change indication is not provided, or when said erroneous video block is interframe encoded and said scene change indication and said interframe indication are both provided.

* * * * *